United States Patent [19]

Dartez et al.

[11] Patent Number: 5,314,023
[45] Date of Patent: May 24, 1994

[54] METHOD FOR SELECTIVELY TREATING WELLS WITH A LOW VISCOSITY EPOXY RESIN-FORMING COMPOSITION

[76] Inventors: Terry R. Dartez, 101 S. Maraist, Kaplan, La. 70548; Roy K. Jones, 4620 Raccoon Dr., Baytown, Tex. 77521

[21] Appl. No.: 5,784

[22] Filed: Jan. 19, 1993

[51] Int. Cl.$^5$ .......................................... E21B 33/138
[52] U.S. Cl. .................... 166/295; 166/278; 405/264; 523/130
[58] Field of Search .............. 166/276, 295, 300; 523/130, 132; 405/264, 266, 267

[56] References Cited

U.S. PATENT DOCUMENTS

| | | | |
|---|---|---|---|
| 3,933,204 | 1/1976 | Knapp | 166/295 |
| 4,042,031 | 8/1977 | Knapp | 166/276 |
| 4,072,194 | 2/1978 | Cole et al. | 166/295 |
| 4,074,760 | 2/1978 | Copeland | 166/276 |
| 4,921,047 | 5/1990 | Summers et al. | 166/276 |
| 4,972,906 | 11/1990 | McDaniel | 166/295 X |
| 5,090,478 | 2/1992 | Summers | 166/295 X |

*Primary Examiner*—George A. Suchfield
*Attorney, Agent, or Firm*—Richard C. Litman

[57] ABSTRACT

Method for selectively treating wells using a low viscosity epoxy resin-forming composition containing a single curing agent. The composition comprises a liquid bisphenol A-based epoxy material and a polyamide hardener for ambient temperature curing of the liquid epoxy material. The epoxy material has a very low viscosity at well surface temperatures and is immiscible with well fluids. The polyamide curing agent used is an amber-colored mobile liquid having a low viscosity at ambient temperature and is further characterized as having long pot life and low exotherm. The method is applicable to plugging permeable zones in a gravel-packed well and may be used to repair leaks in well casing or production tubing and in cementing to prevent communication between subterranean regions.

10 Claims, No Drawings

METHOD FOR SELECTIVELY TREATING WELLS WITH A LOW VISCOSITY EPOXY RESIN-FORMING COMPOSITION

BACKGROUND OF THE INVENTION

1. Field of the Invention

The present invention generally relates to an improved method for selectively treating wells using a low viscosity epoxy resin-forming composition. More particularly, the invention pertains to the use of a low viscosity epoxy resin-forming composition containing a single curing agent which polymerizes to an impermeable solid after a latent period under ambient conditions for downhole applications.

2. Description of the Prior Art

Various processes have been proposed in the patent literature for treating wells with epoxy resin-forming solutions in order to consolidate, isolate or strengthen permeable subterranean earth formations in or around the boreholes of wells. For instance, U.S. Pat. No. 3,933,204 to Knapp describes a well treating process in which a permeable region is plugged by injecting into the region an aqueous emulsion containing an epoxy polymer, an acrylic polymer and a material for controlling the rate of interaction of the two polymers. Another such procedure for utilizing a polymeric material within a permeable structure is set forth in U.S. Pat. No. 4,042,031 to Knapp, which discloses a method for plugging subterranean formations with aqueous epoxy emulsions containing fine solid particles. In addition, U.S. Pat. No. 4,074,760 to Copeland et al. describes an aqueous based slurry containing an epoxy resin, a curing agent, a solvent, a particulate material, a coupling agent and a surfactant for forming consolidated gravel packs. However, these aqueous polymeric emulsions are not sufficiently stable to be stored or transported without agglomeration and can not be easily prepared or handled in the field by the average well technician. Also, such aqueous systems suffer from the inability to form strong packs under a wide range of well conditions.

More recently, U.S. Pat. No. 4,921,047 to Summers et al. teaches compositions for use in sealing permeable subterranean formations which comprises a liquid epoxy material and two hardeners. It is stated that each of the hardeners has a different activation temperature and the hardening time of the epoxy material is of short duration under subsurface conditions of generally elevated temperature and pressure. However, the use of such epoxy formulations in certain well bore applications have inherent disadvantages. For instance, in shallow low temperature wells having a relatively reduced thermal gradient, the epoxy resin-forming compositions taught in the cited prior art may not be able to form a coherent structure of relatively high compressive strengths due to under-cured epoxy material at subsurface temperatures substantially below 170° F., for example. A further disadvantage of such epoxy systems is that they become considerably more viscous at lower surface temperatures, e.g. below 75° F., making them difficult to handle prior to and during placement of the epoxy material. To aid in mixing and handling these epoxy materials under such adverse conditions, the Summers patent suggests the need to preheat the epoxy systems above ambient temperatures. However, this preheating step can effect the fluidity of the epoxy material during placement and may result in uncontrollable set times. Also, operators at the well site are reluctant to use epoxy materials which require the selection of multiple thermally activated hardeners because of the safety risks involved in mishandling large quantities of these highly reactive materials. The energy released from exothermic epoxy reactions using inappropriate types or amounts of hardeners can produce extremely high temperatures which can damage underground equipment or adversely effect the physical properties of the resin product.

SUMMARY OF THE INVENTION

It is accordingly a primary object of the present invention to provide a selective epoxy resin-forming composition suitable for use under a wide range of well surface and downhole conditions.

It is a further object of the invention to provide a selective well treating process using an epoxy resin-forming composition which has a very low viscosity prior to and during placement and is curable to an impermeable solid under ambient conditions.

It is among the additional objects of the present invention to provide a versatile method for treating wells utilizing low viscosity resin compositions which can be conveniently handled and easily prepared at the well site without preheatment.

These and other objects are accomplished in accordance with the present invention which provides a method for selectively treating wells with a low viscosity liquid composition consisting essentially of an epoxy resin-forming solution and a single curing agent. The epoxy solution has a relatively low viscosity at surface and downhole conditions, and is immiscible with well fluids. The curing agent is selective in causing the epoxy solution to polymerize after a relatively short latent period at ambient temperatures.

The method of the present invention comprises selectively plugging a permeable zone in a subterranean formation by delivering the liquid resinous composition downhole of the well. The present liquid compositions may be conveniently delivered to the zone to be plugged with a dump bailer. After being readily displaced from the delivery equipment, the low viscosity composition preferentially migrates into the zone of the formation where it cures at downhole conditions of temperature and pressure to an impermeable, high strength solid which is impervious to chemical attack and cracking.

The present compositions exhibit a low exotherm to prohibit intense heat build-up while epoxy solution and curing agent are being mixed and introduced into the delivery equipment. Moreover, the use of the single hardener or curing agent of this invention provides greater control of the gel time and setting time of the epoxy solution over a wide range of downhole conditions. In addition, the rate of polymerization of the epoxy material is relatively insensitive to minor deviations in optimum proportions of reactants.

The above description, as well as further objects, features and advantages of the present invention, will be more fully appreciated by reference to the following detailed description.

DETAILED DESCRIPTION OF THE INVENTION

The low viscosity epoxy resin-forming composition suitable for purposes of the present invention consists essentially of a low viscosity epoxy solution and a single selective curing agent or hardener for ambient temperature curing of the epoxy material. The epoxy material comprises a very low viscosity polyepoxide liquid obtained by reacting epichlorohydrin and 2,2-bis(4-hydroxyphenyl) propane (bisphenol A). The bisphenol A-based epoxy resin has a density greater than the density of the wellbore fluid to permit complete displacement of the well fluids. A particularly preferred epoxy resin made from epichlorohydrin and bisphenol A is one having a viscosity at 77° F. of about 65 to 100 poises, a density of about 1.15 g/ml at 77° F., and an epoxide equivalent weight of about 175-185 grams (grams of resin containing one gram equivalent of epoxide). This preferred epoxy resin is commercially available and sold under the trademark "EPON RESIN 826" by Shell Chemical Company.

Selected hardeners for ambient temperature curing of the liquid epoxy material include polyamides or condensation products of a fatty polycarboxylic acid and an aliphatic or heterocyclic polyamine. Suitable polyamide hardening agents may be derived from dimerized fatty acids such as oleic, linoleic or linolenic acid and ethylenediamine, diethylenetriamine, tetraethylenepentamine and/or imidazoline. Commercial fatty polyamides are amber-colored mobile liquids which have a low viscosity at 77° F. of about 150-400 centipoises, and amine values of about 100-450. The amine value is expressed as the number of milligrams of KOH which is equivalent to the base content of one gram of polyamide as determined by titration with HCl. The preferred curing agent is a polyamidoamine with a very high imidazoline content, and is commercially sold under the registered trademark "ANACAMIDE 506" by Pacific Anchor Chemical. Additional characteristics of this preferred product includes its very long pot life and low exotherm.

The liquid epoxy resin and curing agent or hardener may be combined at the well site under ambient atmospheric conditions. Since these materials are easily handled and readily mixed without preheating, this mixing step can be accomplished by any well technician of average skill.

The relative amounts of curing agent and resin may be varied considerably depending upon the parameters of the given application. The concentration of the hardener can readily be determined by knowing the downhole temperature and pressure conditions, as well as a knowledge of the available working time, i.e., the length of time between adding the curing agent and the final placement of the resin-forming composition downhole. Generally, the polyamide hardener may be used at a concentration within the range of about 10 to about 50 parts by weight hardener per 100 parts by weight epoxy resin. These relative proportions of the present system components are generally equivalent to a volume ratio of curing agent to resin of about 1:10 to about 1:2. It should be pointed out that precise laboratory measurements are not required when mixing the present components since a slight error in the ratio of hardener to epoxy material does not measurably affect the overall characteristics of the final resin system. This allows the present compositions to be prepared under field conditions by the average well technician using gallon containers, for example. The polyamide curing agent is preferably mixed with the epoxy resin at a concentration of less than stoichiometrically required amounts to cause the epoxy resin to polymerize after a latent period to a high-strength solid at a temperature below about 80° F. or as high as 250° F., for example.

The compositions and process of the present invention can be used in a variety of oil and gas well applications, which generally include cementing, water control, casing and gravel pack screen repair, as well as repairing other well hardware. The invention is especially applicable to gravel-packed wells where the accumulation of formation sand particles in the wellbore or water encroachment into the completion interval has resulted in the reduction or cessation of the well's productivity. By selectively plugging the lower portion of a gravel packed production zone of a well bore penetrating a subterranean formation utilizing the compositions of the present invention, it is possible to eliminate the flow of water and/or sand and restore the production of oil or gas from the well.

A gravel-packed well is a construction system in which uniform sand grains or gravel are placed in the well's perforations and in the annular volumes between the well's production casing and a slotted or perforated tubing, which is externally wrapped with a wire screen. The gravel is slightly larger than the formation sand particles, and since they are tightly packed together, they usually prevent the collapse of the perforation tunnels and act as a filter to prevent the migration of formation sand into the wellbore. The wire wrapped or slotted screen is placed between two packers and contains the gravel in an area adjacent to the perforated interval and normally prevents the movement of the gravel and formation sand into the production tubing.

In the event that the formation water moves into the completion interval, the well treating method of the present invention is particularly effective in sealing off the water producing zone located in lower portion of gravel-packed wells. The initial step of the present method is to mix the liquid epoxy resin material and polyamide hardener together under ambient atmospheric conditions to form a low viscosity resin-forming composition. In the next step of the method, the low viscosity mixture is introduced into the well and placed in the area of the permeable zone to be plugged. Any conventional dump bailer may be used to deliver the liquid mixture of epoxy and hardener to the desired location within the wellbore. The dump bailer containing the epoxy/hardener mixture can be run into the hole on a cable or wire to the designated depth and then actuated to release the contained composition. After allowing time for the liquid mixture of epoxy and hardener to completely dump, the bailer can be pulled from the well. Suitable types of dump bailers for use with the present invention include positive displacement or gravity dump bailers such as electric wireline and slickline (nonconductive wireline) dump bailers, open bailers, as well as other mechanical devices which operate in a similar manner. It is also possible to place the liquid epoxy/hardener mixture at the selected location in the well by pumping the liquid from the surface through tubing or by means of a conventional coiled tubing.

The polyamide hardener has no minimum activation temperature, per se, since polymerization of the epoxy solution can effectively proceed at temperatures substantially below about 75° F., for example. The reaction of epoxy material is generally initiated upon mixing with the polyamide curing agent under most ambient conditions of temperature and pressure. Therefore, the polyamide/epoxy compositions of the present invention find particular application in shallow low temperature wells, below about 170° F., where ambient temperature curing of the epoxy material becomes necessary under these normally adverse conditions. However, the method of the present invention is applicable over a wide range of conditions and the present compositions have been utilized at downhole temperatures of up to about 350° F. with satisfactory results.

The present epoxy compositions remains a flowable, low viscosity liquid prior to and during placement to provide optimum displacement and gel times. Once penetration of the permeable zone is achieved, the epoxy stops flowing and the time required for this to occur is defined as the set time. With additional time, the epoxy material eventually reaches the final curing stage and forms a solid resin which substantially resists cracking and can withstand cyclic temperature fluctuations within the subterranean formation. This solid resin material is also impervious to various oilfield fluids and chemicals.

In the application of the method of the invention, variation of the ratio of polyamide hardener to epoxy resin is used to control the gel times of the present epoxy resin-forming systems and their set times over a broad range of conditions. The well temperature may influence the length of time the epoxy remains as a low viscosity liquid, but has substantially no effect on whether the systems sets up or not since the present systems are based on ambient temperature curing. For instance, in subterranean regions of a relatively a low temperature well (about 120° F.), a system in accordance with the present invention having a ratio of curing agent to epoxy ratio of about 1:6 provides 1–2 hours of gel time and completely cures in 16 hours. In a high temperature well having a bottom-hole temperature of about 350° F., a gel time of about 5 hours was obtained using a system of the present invention with a ratio of curing agent to epoxy of about 1:10. This particular system solidified after the 5-hour gel time and could be tagged after 8 hours.

The total quantity of epoxy composition used to plug off a gravel-packed interval depends on the size of the gravel packing and the portion of the gravel pack which it is desired to plug. Usually an amount of epoxy composition between about 1 and 2 times the volume of the interval to be sealed is sufficient for purposes of the present invention. Since the capacity of a bailer or coiled tubing is limited, it may be necessary to carry out the delivery step of the present process in multiple stages.

The following specific example is given to further illustrate the present invention. All relative proportions are set forth as parts by volume unless otherwise specifically indicated.

EXAMPLE

The subject gravel packed well is located offshore of Louisiana and was completed in November of 1991. The well has a bottom-hole temperature of 138° F. and a bottom-hole pressure of 1,695 psi. The data on the completed well showed a normal gas production of 3.209 MMcf/d, with 0 (zero) oil and 0 water through perforations at a depth of 4,322 feet to 4,346 feet.

A 2⅜-inch production tubing is connected in the bottom of the well to a slotted tubing which is surrounded by a gravel pack screen having an internal diameter of 4 inches. A 7⅝-inch production casting is filled with gravel which surrounds the lower portion of the production tubing and the screened slotted tubing. The lower extent of the gravel pack is defined by a bottom packer which had been previously placed in the well at approximately 4,358 feet.

The gas production rate began a steady decline and the well suddenly began producing large quantities of sand and trace amounts of water. Sand production increased to the extent that the well had to be shut down for safety purposes.

An engineering survey of the well determined that the gravel pack screen was damaged in the lower portion of the completed interval at a depth of approximately 4,340 feet. The following treatment procedure was conducted to seal off this zone:

A resin composition was prepared by mixing 6 part of "EPON RESIN 826" epoxy material with 1 parts "ANCAMIDE 506" hardener in a 5-gallon container and placed in a electric wireline dump bailer. The dump bailer containing the liquid epoxy/hardener mixture was quickly run into the hole to a position about 6 feet above the lowest perforation. The dump bailer was then actuated and the contents were readily displaced from the bailer and drained into the screened interval. The empty dump bailer was removed from the hole and cleaned with a hydrocarbon solvent.

No thief tool runs were necessary and the resin top was tagged in 4 hours after the initial placement.

The bailer was filled with the same liquid epoxy/hardener mixture in the identical proportions as the initial placement procedure and again run into the well to a level about a foot above the hardened resin top. After dumping the liquid mixture, the bailer was removed from the well and the epoxy composition was allowed to harden in place for about 4 hours. This step was repeated until a solid resin plug was built from 4,340 feet to 4,330 feet. Perforated holes in the production tubing from 4,334 to 4,348 feet were plugged off, with the holes at 4,305–10 feet remaining open to flow the well.

A total of 11 gallons of the liquid epoxy/hardener mixture were delivered via the dump bailer throughout the entire procedure. Liquid resin was allowed to flow through the holes in the production tubing, into and through the gravel pack screen, through the gravel pack itself and outward into the casing with a portion of the resin actually migrating into the producing formation. The tubing volume from 4340–30 feet required 1.625 gallons of resin to fill, with the remaining resin, 9.375 gallons, migrating through the screen and into the gravel pack.

Two hours after the final resin top was tagged, the well was returned to production. The above treatment proved effective in sealing off the damaged screen, plugging back from the water producing zone, and stabilizing the adjacent formation. A test was conducted on the treated well and showed a gas production of 3.0 MMcf/d, with no show of water or sand. Six months after this test, the well remains in production.

While the invention has been specifically described in its application to a gravel-packed well, it should not be limited solely to such use. The epoxy resin composition and treatment method particularly disclosed herein may be used to plug any type of porous subterranean zone or formation in a well. Other applications for this invention may include repairing leaks in well casing and cement to prevent communication between zones, for example.

It should be understood that there may be various changes and modifications of the representative embodiments herein chosen for purposes of illustration without departing from the spirit and scope of the invention. Accordingly, the foregoing illustration are not to be interpreted as restrictive of the invention beyond that necessitated by the following claims.

We claim:

1. A well treating method for selectively plugging a permeable zone in a subterranean formation comprising the steps of:
   preparing a low viscosity epoxy resin-forming composition consisting essentially of a low viscosity epoxy material obtained by reacting epichlorohydrin and 2,2-bis(4-hydroxyphenyl) propane and a single liquid polyamide hardener by mixing the low viscosity epoxy material with the liquid polyamide hardener for ambient temperature curing of the epoxy material;
   introducing the low viscosity epoxy resin-forming composition via a well bore into the permeable zone; and
   curing said epoxy material to form solid resin which substantially plugs said permeable zone.

2. The method according to claim 1 wherein the polyamide hardener is present in said epoxy resin-forming composition at a concentration within the range of about 10 to about 50 parts by weight hardener per 100 parts by weight of the epoxy material.

3. The method according to claim 1 wherein said epoxy material is further characterized as having a viscosity at 77° F. of about 65 to 100 poises, a density of about 1.15 g/ml at 77° F., and an epoxide equivalent weight of about 175–185 grams.

4. The method according to claim 1 wherein said polyamide hardener is a condensation product of a fatty polycarboxylic acid and an aliphatic or heterocyclic polyamine.

5. The method according to claim 4 wherein said polyamide hardener is derived from a dimerized fatty acid selected from the group consisting of oleic, linoleic and linolenic acid and a polyamine selected from the group consisting of ethylenediamine, diethylenetriamine, tetraethylenepentamine and imidazoline.

6. The method according to claim 5 wherein the polyamide hardener is further characterized as being an amber-colored mobile liquid having a viscosity at 77° F. of about 150–400 centipoises, and amine values of about 100–450.

7. The method according to claim 6 wherein the polyamide hardener is a polyamidoamine with a high imidazoline content.

8. The method according to claim 1 wherein the permeable zone to be plugged is located in a gravel-packed well.

9. The method according to claim 8 wherein said zone to be plugged is located in the lower portion of a gravel packed production zone of a well bore penetrating a subterranean formation.

10. The method according to claim 8 wherein the low viscosity epoxy resin-forming composition is delivered to said zone in a dump bailer.

* * * * *